(12) United States Patent
Kim et al.

(10) Patent No.: US 9,204,431 B2
(45) Date of Patent: Dec. 1, 2015

(54) METHOD OF TRANSMITTING CONTROL INFORMATION AND DEVICE FOR SAME

(75) Inventors: Hakseong Kim, Anyang-si (KR); Hanbyul Seo, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 124 days.

(21) Appl. No.: 13/878,376

(22) PCT Filed: Oct. 13, 2011

(86) PCT No.: PCT/KR2011/007614
§ 371 (c)(1),
(2), (4) Date: Apr. 8, 2013

(87) PCT Pub. No.: WO2012/050372
PCT Pub. Date: Apr. 19, 2012

(65) Prior Publication Data
US 2013/0195006 A1    Aug. 1, 2013

Related U.S. Application Data

(60) Provisional application No. 61/392,924, filed on Oct. 13, 2010.

(51) Int. Cl.
*H04W 72/04* (2009.01)
*H04W 56/00* (2009.01)
*H04L 1/00* (2006.01)
*H04L 1/16* (2006.01)
*H04L 1/18* (2006.01)
*H04B 7/26* (2006.01)
(Continued)

(52) U.S. Cl.
CPC ......... *H04W 72/0406* (2013.01); *H04L 1/0026* (2013.01); *H04L 1/0083* (2013.01); *H04L 1/1671* (2013.01); *H04L 1/1861* (2013.01); *H04L 5/0053* (2013.01); *H04W 56/001* (2013.01); *H04B 7/15542* (2013.01); *H04B 7/2656* (2013.01); *H04L 5/0007* (2013.01); *H04L 5/0044* (2013.01); *H04L 5/0051* (2013.01)

(58) Field of Classification Search
USPC ................. 370/252, 280–281, 315, 328–329
See application file for complete search history.

(56) References Cited

U.S. PATENT DOCUMENTS 8,140,102 B2 *   3/2012  Nory et al. .................... 455/522
2008/0298497 A1  12/2008  Cho et al.
(Continued)

FOREIGN PATENT DOCUMENTS

JP    2010-525722 A     7/2010
KR  10-2009-0099500 A   9/2009
(Continued)

*Primary Examiner* — Edan Orgad
*Assistant Examiner* — Steven Willmore
(74) *Attorney, Agent, or Firm* — Birch, Stewart, Kolasch & Birch, LLP

(57) ABSTRACT

The present invention relates to a wireless communication system. In more detail, in relation to an uplink transmission method, the present invention relates to a method which includes: generating a signal for uplink transmission; transmitting the signal by using a subframe #n; if the subframe #n and a subframe #n+1 are subframes for respectively different links, not transmitting the signal in the last symbol of the subframe #n; and if the subframe #n and the subframe #n+1 are subframes for the same link, transmitting the signal by using the last symbol of the subframe #n, and to a device for same.

10 Claims, 17 Drawing Sheets

(51) Int. Cl.
*H04L 5/00* (2006.01)
*H04B 7/155* (2006.01)

(56) References Cited

U.S. PATENT DOCUMENTS

| | | |
|---|---|---|
| 2009/0046693 A1* | 2/2009 | Nory et al. .................... 370/343 |
| 2009/0219842 A1 | 9/2009 | Moon et al. |
| 2009/0296609 A1* | 12/2009 | Choi et al. .................... 370/281 |
| 2010/0329220 A1 | 12/2010 | Kim et al. |
| 2011/0032850 A1* | 2/2011 | Cai ............................... 370/280 |
| 2011/0170436 A1* | 7/2011 | Doan et al. .................... 370/252 |
| 2011/0255431 A1* | 10/2011 | Wang et al. .................... 370/252 |
| 2011/0268028 A1* | 11/2011 | Stern-Berkowitz et al. .. 370/328 |
| 2012/0034927 A1* | 2/2012 | Papasakellariou et al. ... 455/450 |
| 2012/0106374 A1* | 5/2012 | Gaal et al. ..................... 370/252 |

FOREIGN PATENT DOCUMENTS

| | | |
|---|---|---|
| WO | WO 2009/125946 A2 | 10/2009 |
| WO | WO 2009132591 A1 * | 11/2009 |
| WO | WO 2010041878 A2 * | 4/2010 |
| WO | WO 2010068047 A2 * | 6/2010 |
| WO | WO 2010093221 A2 * | 8/2010 |
| WO | WO 2010098584 A2 * | 9/2010 |

* cited by examiner reuse of LTE PUCCH format 2 structure (standard CP case)

FIG. 15

| Subframe index | n | | | | | | | | n+1 | | | | | | | |
|---|---|---|---|---|---|---|---|---|---|---|---|---|---|---|---|---|
| Symbol index | 0 | 1 | 2 | 3 | 4 | 5 | 6 | 0 | 1 | 2 | 3 | 4 | 5 | 6 |
| Available symbol | 0 | 1 | 2 | 3 | 4 | 5 | | | 0 | 1 | 2 | 3 | 4 | 5 | |
| Unavailable symbol | | | | | | | X | | | | | | | | X |

FIG. 16

| Subframe index | n | | | | | | | | n+1 | | | | | | | |
|---|---|---|---|---|---|---|---|---|---|---|---|---|---|---|---|---|
| Symbol index | 0 | 1 | 2 | 3 | 4 | 5 | 6 | | 0 | 1 | 2 | 3 | 4 | 5 | 6 | |
| Available symbol | 0 | 1 | 2 | 3 | 4 | 5 | | | 0 | 1 | 2 | 3 | 4 | 5 | | |
| Unavailable symbol | | | | | | | S | | | | | | | | | X |

PUCCH format 1/2/3 SRS transmission

METHOD OF TRANSMITTING CONTROL INFORMATION AND DEVICE FOR SAME

CROSS REFERENCE TO RELATED APPLICATIONS

This application is the National Phase of PCT/KR2011/007614 filed on Oct. 13, 2011, which claims priority under 35 U.S.C. §119(e) to U.S. Provisional Application No. 61/392,924 filed on Oct. 13, 2010, all of which are hereby expressly incorporated by reference into the present application.

TECHNICAL FIELD

The present invention relates to a wireless communication, and more particularly, to a method of transmitting control information and apparatus therefor.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of CDMA (code division multiple access) system, FDMA (frequency division multiple access) system, TDMA (time division multiple access) system, OFDMA (orthogonal frequency division multiple access) system, SC-FDMA (single carrier frequency division multiple access) system and the like.

DISCLOSURE OF THE INVENTION

Technical Tasks

One object of the present invention is to provide a method of efficiently transmitting control information and apparatus therefor. Another object of the present invention is to provide a method of efficiently transmitting uplink control information in a situation that a plurality of subframes for different links coexist, method of efficiently managing resources for the same, and apparatus therefor. Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, in performing an uplink transmission of a communication apparatus in a wireless communication system, a method according to one embodiment of the present invention includes the steps of generating a signal for the uplink transmission and transmitting the signal using a subframe #n, wherein if the subframe #n and a subframe #(n+1) are subframes for different links, respectively, the signal is not transmitted in a last symbol of the subframe #n and wherein if the subframe #n and the subframe #(n+1) are subframes for a same link, the signal is transmitted using the last symbol of the subframe #n.

To further achieve these and other advantages and in accordance with the purpose of the present invention, a communication apparatus, which is used in a wireless communication system, according to another embodiment of the present invention comprises an RF (radio frequency) unit and a processor configured to generate a signal for the uplink transmission, the processor configured to transmit the signal using a subframe #n, wherein if the subframe #n and a subframe #(n+1) are subframes for different links, respectively, the signal is not transmitted in a last symbol of the subframe #n and wherein if the subframe #n and the subframe #(n+1) are subframes for a same link, the signal is transmitted using the last symbol of the subframe #n.

Preferably, the communication apparatus includes a relay node. More preferably, if the subframe #n and the subframe #(n+1) are a backhaul subframe and an access subframe, respectively, the signal is not transmitted in the last symbol of the subframe #n. Moreover, if both of the subframe #n and the subframe #(n+1) are backhaul subframes, the signal is transmitted using the last symbol of the subframe #n.

Preferably, the communication apparatus is a user equipment. More preferably, if the subframe #n and the subframe #(n+1) are an access subframe and a backhaul subframe, respectively, the signal is not transmitted in the last symbol of the subframe #n. Moreover, if both of the subframe #n and the subframe #(n+1) are access subframes, the signal is transmitted using the last symbol of the subframe #n.

Preferably, the signal for the uplink transmission comprises at least one of an SRS (Sounding Reference Signal), a PUCCH (Physical Uplink Control Channel) signal and a PUSCH (Physical Uplink Shared Channel) signal.

Advantageous Effects

According to the present invention, control information can be efficiently transmitted in a wireless communication system. In particular, in case that a plurality of subframes for different links coexist, uplink control information can be efficiently transmitted and resources for the same can be efficiently managed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 15 shows one example of an operation in case of the setting of the timing configuration shown in FIG. 14.

FIG. 16 shows one example of backhaul/uplink transmission according to one embodiment of the present invention.

BEST MODE FOR INVENTION

First of all, the following descriptions are usable for various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented by such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in DL and SC-FDMA in UL.

For clarity, the following description mainly concerns 3GPP LTE/LTE-A, by which the present invention may be non-limited. Moreover, in the following description, specific terminologies are provided to help the understanding of the present invention. And, the use of the specific terminology can be modified into another form within the scope of the technical idea of the present invention.

In a wireless communication system, a user equipment may be able to receive information in downlink (DL) from a base station and may be also able to transmit information in uplink (UL). Information transmitted/received by a user equipment may include data and various kinds of control information and various kinds of physical channels may exist in accordance with types and usages of the information transmitted/received by the user equipment.

Figure 1:
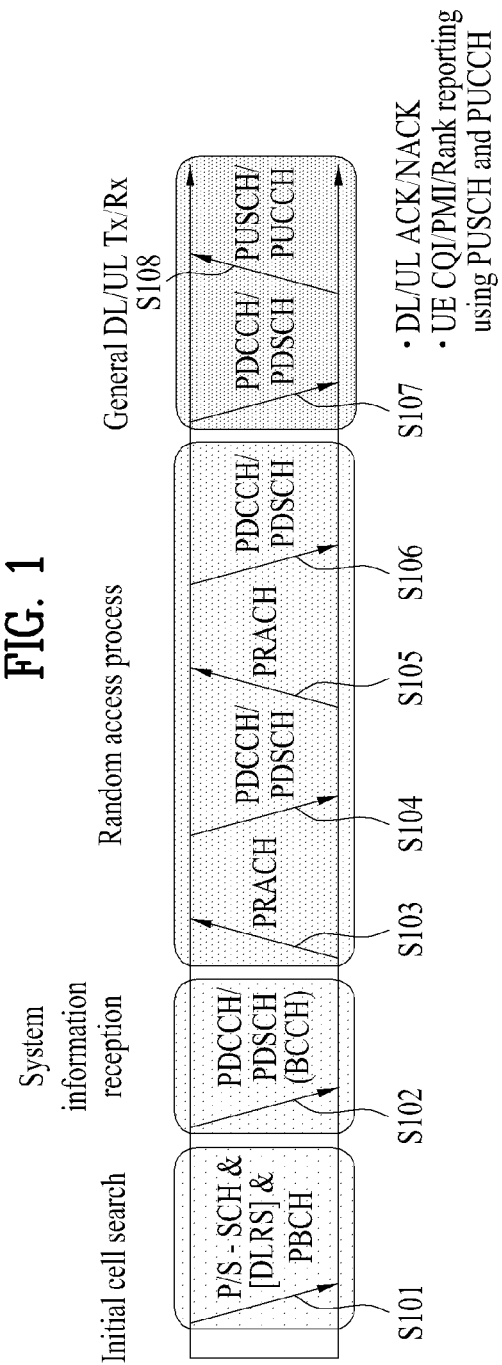
FIG. 1 shows one example of physical channels used by a wireless communication system (e.g., 3GPP LTE system) and a general signal transmitting method using the physical channels.

FIG. 1 shows one example of physical channels used by a wireless communication system (e.g., 3GPP LTE system) and a general signal transmitting method using the physical channels.

If a power of a user equipment is turned on from turn off or the user equipment enters a new cell, the user equipment may perform an initial cell search job for matching synchronization with a base station and the like [S101]. To this end, the user equipment may receive a primary synchronization channel (P-SCH) and a secondary synchronization channel (S-SCH) from the base station, may match synchronization with the base station and may then obtain information such as a cell ID and the like. Subsequently, the user equipment may receive a physical broadcast channel from the base station and may be then able to obtain intra-cell broadcast information. Meanwhile, the user equipment may receive a downlink reference signal (DL RS) and may be then able to check a DL channel state.

Having completed the initial cell search, the user equipment may receive a physical downlink control channel (PDCCH) and a physical downlink shared control channel (PDSCH) according to the physical downlink control channel (PDCCH) and may be then able to obtain a detailed system information [S102].

Subsequently, the user equipment may be able to perform a random access procedure to complete the access to the base station [S103 to S106]. To this end, the user equipment may transmit a specific sequence as a preamble via a physical random access channel (PRACH) [S103] and may be then able to receive a response message via PDCCH and a corresponding PDSCH in response to the random access [S104]. In case of a contention based random access, it may be able to perform a contention resolution procedure such as a transmission S105 of an additional physical random access channel and a channel reception S106 of a physical downlink control channel and a corresponding physical downlink shared channel.

Having performed the above mentioned procedures, the user equipment may be able to perform a PDCCH/PDSCH reception S107 and a PUSCH/PUCCH (physical uplink shared channel/physical uplink control channel) transmission S108 as a general uplink/downlink signal transmission procedure. Control information transmitted to a base station by a user equipment may be commonly named uplink control information (hereinafter abbreviated UCI). The UCI may include HARQ-ACK/NACK (Hybrid Automatic Repeat and reQuest Acknowledgement/Negative-ACK), SR (Scheduling Request), CQI (Channel Quality Indication), PMI (Precoding Matrix Indication), RI (Rank Indication) information and the like. In this specification, HARQ-ACK is simply named HARQ-ACK or ACK/NACK (AN). The HARQ-ACK includes at least one of a positive ACK (simply, ACK), a negative ACK (NACK), DTX and NACK/DTX. The UCI is normally transmitted via PUCCH by periods. Yet, in case that both control information and traffic data need to be simultaneously transmitted, the UCI may be transmitted on PUSCH. Moreover, the UCI may be non-periodically transmitted on PUSCH in response to a request/indication made by a network.

Figure 2:
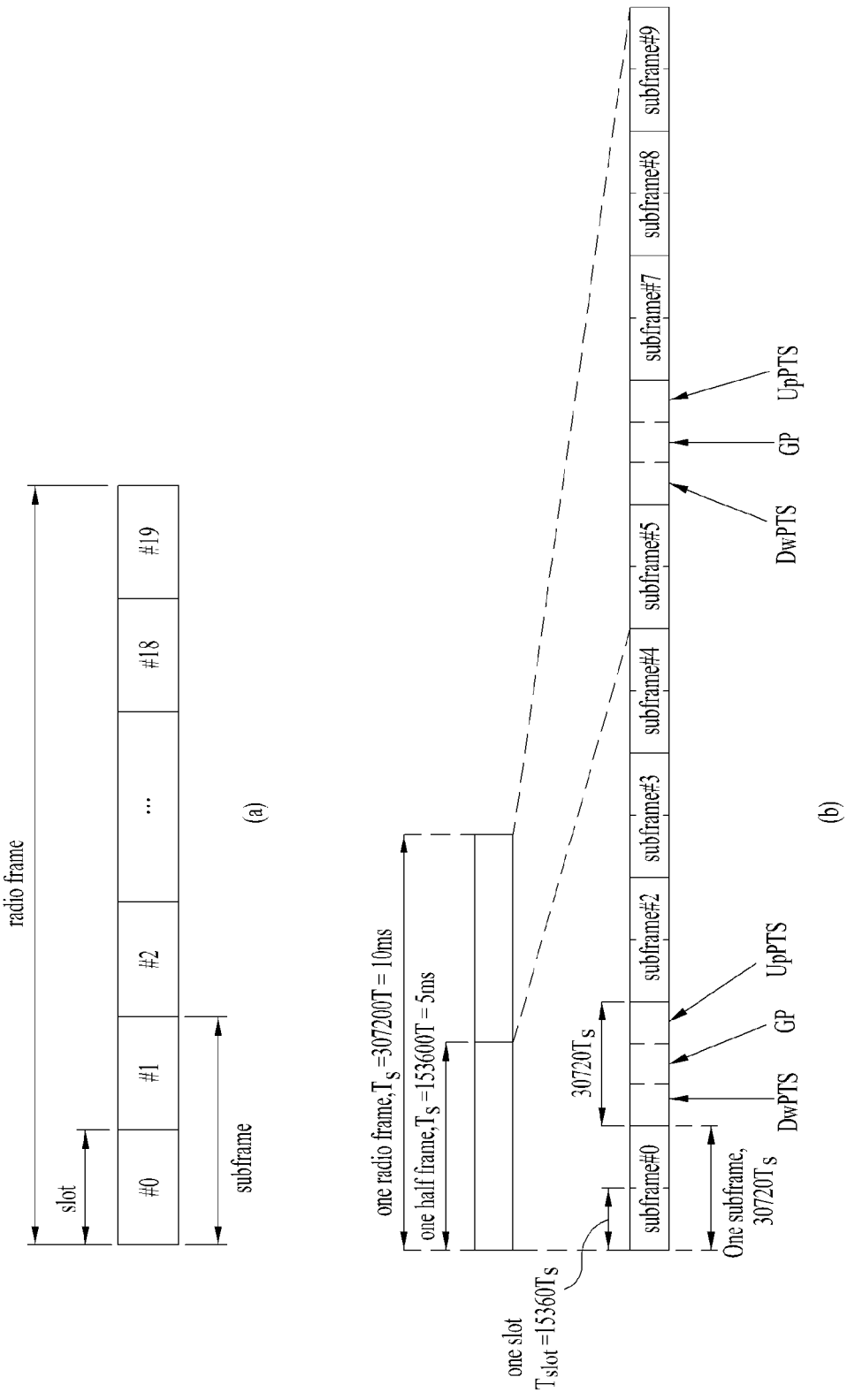
FIG. 2 shows one example of a structure of a radio frame.

FIG. 2 shows one example of a structure of a radio frame. In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2 (*a*) shows one example of a structure of a radio frame of type 1. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP (cyclic prefix). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, in the front part of maximum of 3 OFDM symbols of each subframe may be allocated to PDCCH (physical downlink control channel), while the rest of the OFDM symbols are allocated to PDSCH (physical downlink shared channel).

FIG. 2 (b) shows one example of a structure of a radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink.

The above-described structures of the radio frame are just exemplary. And, the number of subframes included in a radio frame, the number of slots included in the subframe and the number of symbols included in the slot may be modified in various ways.

Figure 3:
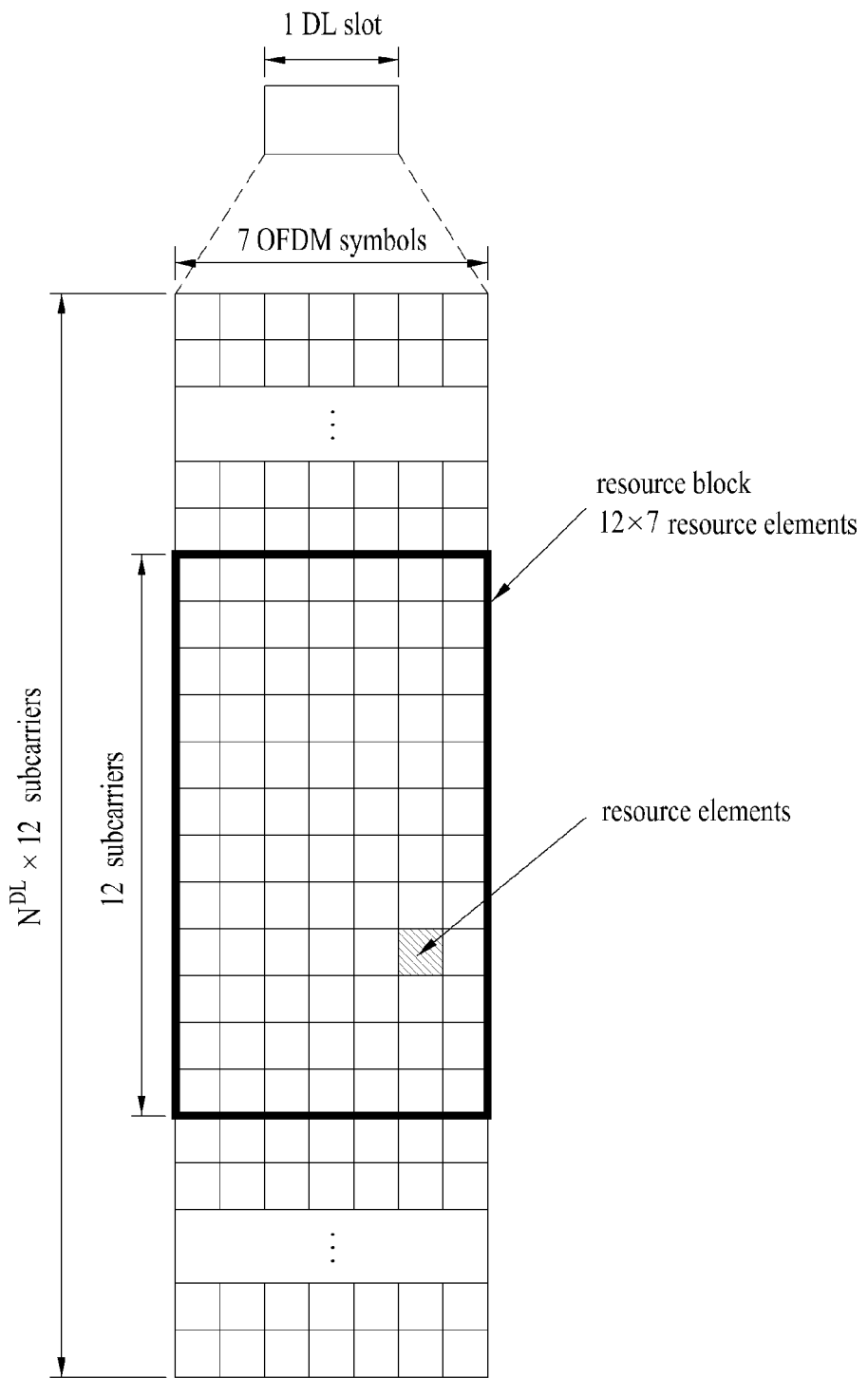
FIG. 3 shows one example of a resource grid of a downlink slot.

FIG. 3 shows one example of a resource grid of a downlink slot.

Referring to FIG. 3, a DL slot includes a plurality of OFDM symbols in time domain. One DL slot includes 7(or 6) OFDM symbols and a resource block may include 12 subcarriers in frequency domain. Each element on a resource grid is called a resource element (RE). One RB includes 12×7 (or 12×6) REs. The number $N_{RB}$ of RBs included in the DL slot depends on a DL transmission band. A structure of a UL slot is identical to that of the DL slot but OFDM symbol is replaced by SC-FDMA symbol.

Figure 4:
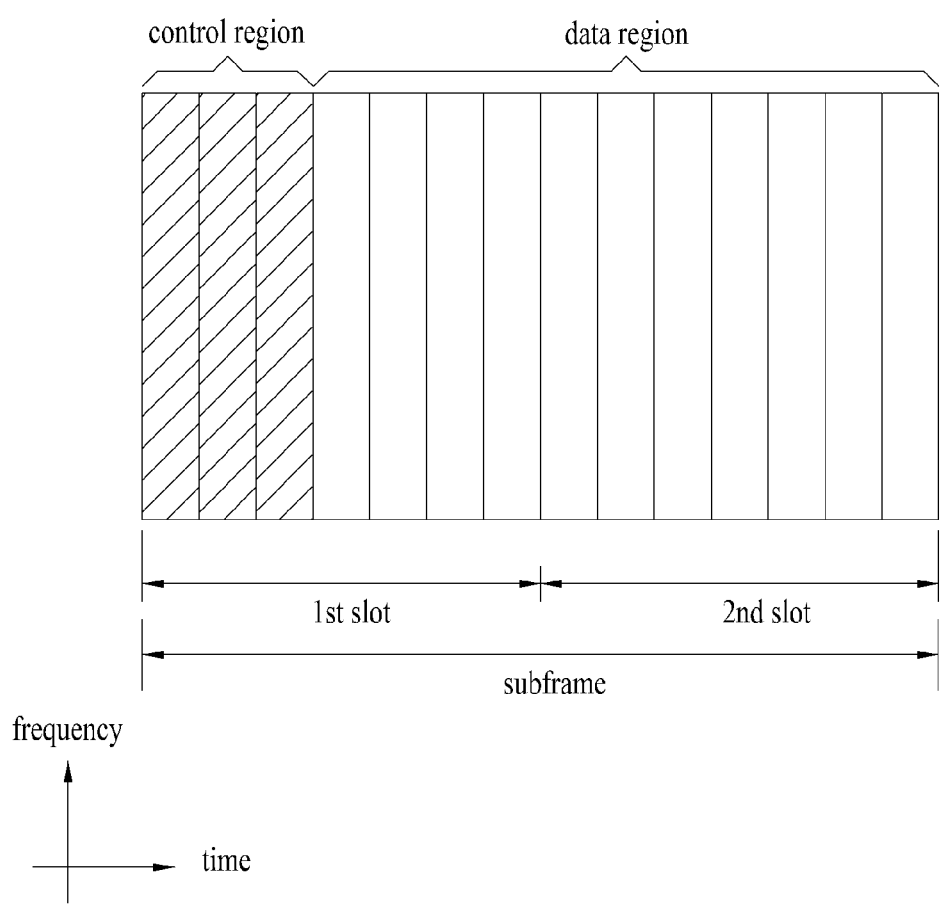
FIG. 4 shows a structure of a downlink (hereinafter abbreviated DL) frame.

FIG. 4 shows one example of a structure of a DL subframe.

Referring to FIG. 4, maximum 3 (or 4) OFDM symbols situated at a head part of a 1st slot of a subframe correspond to a control region to which a control channel is assigned. And, the rest of OFDM symbols correspond to a data region to which PDSCH (physical downlink shared channel) is assigned. For example, DL control channels used by 3GPP LTE may include PCFICH (Physical Control Format Indicator Channel), PDCCH (Physical Downlink Control Channel), PHICH (Physical Hybrid ARQ Indicator Channel) and the like. The PCFICH is transmitted on a 1st OFDM symbol of a subframe and carries information on the number of OFDM symbols used for a control channel transmission in the subframe. The PHICH carries HARQ ACK/NACK (acknowledgment/negative-acknowledgment) signal in response to a UL transmission.

Control information transmitted on PDCCH is called DCI (downlink control information). The DCI includes a resource allocation information for a user equipment or a user equipment group and other control information. For instance, the DCI includes UL/DL scheduling information, UL transmit (Tx) power control command and the like.

PDCCH carries transmit format and resource allocation information of DL-SCH (downlink shared channel), transmit format and resource allocation information of UL-SCH (uplink shared channel), paging information on PCH (paging channel), system information on DL-SCH, resource allocation information of a higher-layer control message such as a random access response transmitted on PDSCH, Tx power control command set for individual user equipments within a user equipment group, Tx power control command, activation indication information of VoIP (voice over IP) and the like. A plurality of PDCCHs may be transmitted in a control region. A user equipment may be able to monitor a plurality of PDCCHs. PDCCH is transmitted on aggregation of at least one or more contiguous CCEs (control channel elements). In this case, the CCE is a logical assignment unit used to provide PDCCH with a coding rate based on a radio channel state. The CCE corresponds to a plurality of REGs (resource element groups). PDCCH format and the number of PDCCH bits are determined depending on the number of CCEs. A base station determines PDCCH format in accordance with DCI to transmit to a user equipment and attaches CRC (cyclic redundancy check) to control information. The CRC is masked with an identifier (e.g., RNTI (radio network temporary identifier)) in accordance with an owner or a purpose of use. For instance, if PDCCH is provided for a specific user equipment, CRC may be masked with an identifier (e.g., C-RNTI (cell-RNTI)) of the corresponding user equipment. If PDCCH is provided for a paging message, CRC may be masked with a paging identifier (e.g., P-RNTI (paging-RNTI)). If PDCCH is provided for system information (particularly, SIC (system information block)), CRC may be masked with SI-RNTI (system information-RNTI). And, if PDCCH is provided for a random access response, CRC may be masked with RA-RNTI (random access-RNTI).

Figure 5:
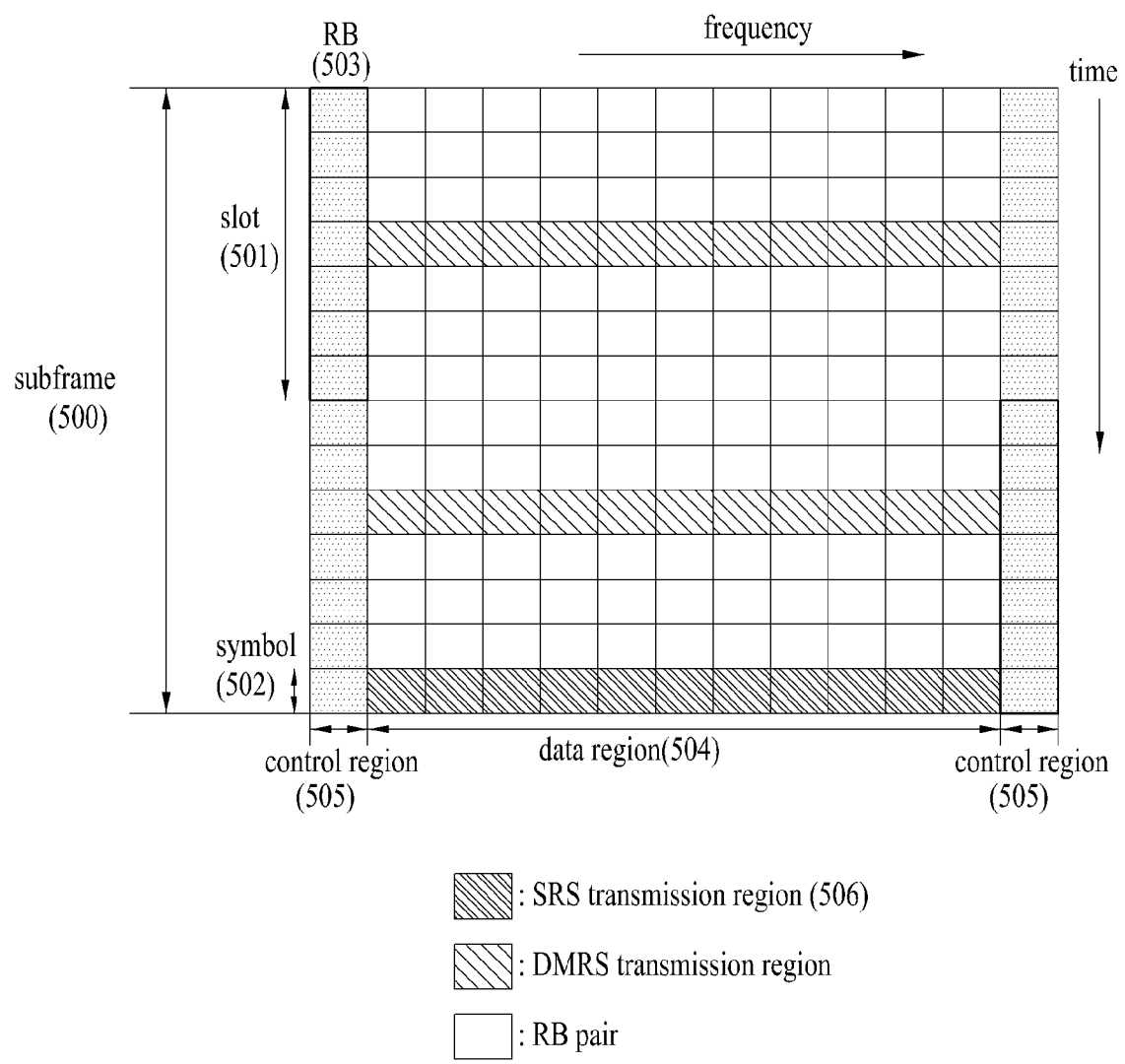
FIG. 5 shows one example of a structure of an uplink subframe.

FIG. 5 shows one example of a structure of a UL subframe used by LTE.

Referring to FIG. 5, a subframe 500 corresponding to a basic unit of LTE UL transmission includes a pair of 0.5 ms slots 501. Assuming a length of a normal CP (cyclic prefix), each of the slots includes 7 symbols 502 and each of the symbols corresponds to a single SC-FDMA symbol. A resource block (RB) 503 is a resource allocation unit. In particular, the resource allocation unit corresponds to 12 subcarriers in frequency domain and also corresponds to a single slot in time domain. A structure of an uplink subframe of LTE is mainly divided into a data region 504 and a control region 505. The data region includes PUSCH and is used to transmit such a data signal as audio and the like. The control region includes PUCCH and is used to transmit uplink control information (UCI). The PUCCH includes an RB pair situated at both end portions of the data region on a frequency axis and hops using a slot as a boundary.

PUCCH is usable to transmit the control information as follows.

SR (scheduling request): this is information used to request an uplink UL-SCH resource. This is transmitted by OOK (on-off keying).

HARQ ACK/NACK: This is a response signal for a DL data packet on PDSCH. This indicates whether the DL data packet is successfully received. In response to a single DL codeword, 1-bit ACK/NACK is transmitted. In response to two DL codewords, 2-bit ACK-NACK is transmitted.

CQI (channel quality indicator): This is the feedback information on a DL channel. MIMO (multiple input multiple output) related feedback information includes RI (rank indicator), PMI (precoding matrix indicator), PTI (precoding type indicator) and the like. 20 bits are used per subframe.

A size of control information (UCI) transmittable in a subframe by a user equipment depends on the number of SC-FDMAs available for a control information transmission. The SC-FDMA available for the control information transmission means SC-FDMA symbol remaining after excluding SC-FDMA symbol for a reference signal transmission from a subframe. In case of an SRS (sounding reference signal) configured subframe, a last SC-FDMA symbol of the subframe is excluded as well. A reference signal is used for coherent detection of PUCCH. And, the PUCCH supports 7 formats depending on transmitted information.

Table 1 shows a mapping relation between PUCCH format and UCI in LTE.

TABLE 1

| PUCCH format | Uplink Control Information (UCI) |
| --- | --- |
| Format 1 | SR(Scheduling Request) (non-modulated waveform) |
| Format 1a | 1-bit HARQ ACK/NACK (SR presence/non-presence) |
| Format 1b | 2-bit HARQ ACK/NACK (SR presence/non-presence) |
| Format 2 | CQI (20 coded bits) |
| Format 2 | CQI & 1- or 2-bit HARQ ACK/NACK (20 bits) (corresponding to an extended CP only) |
| Format 2a | CQI & 1-bit HARQ ACK/NACK ((20 + 1) coded bits) |
| Format 2b | CQI & 2-bit HARQ ACK/NACK ((20 + 2) coded bits) |

A sounding reference signal (SRS) is transmitted on SC-FDMA symbol located last on a time axis in a single subframe. SRSs of several user equipments, which are transmitted on last SC-FDMA of the same subframe, can be identified depending on a frequency position/sequence.

In the legacy LTE, SRS is transmitted by periods. A configuration for a periodic transmission of SRS is configured with a cell-specific SRS parameter and a UE-specific (user equipment-specific) SRS parameter. The cell-specific SRS parameter (i.e., cell-specific SRS configuration) and the UE-specific SRS parameter (i.e., UE-specific SRS configuration) are transmitted to a user equipment through upper layer (e.g., RRC) signaling. Similarly, in case of a relay node system, an SRS configuration for a relay node is configured with a cell-specific SRS parameter and a relay node-specific (RN-specific) SRS parameter.

The cell-specific SRS parameter includes srs-BandwidthConfig and srs-SubframeConfig. The srs-BandwidthConfig indicates information on a frequency band for transmitting SRS and the srs-SubframeConfig indicates information on a subframe for transmitting SRS. A subframe for transmitting SRS in a cell is periodically configured within a frame. Table 2 show the srs-SubframeConfig in the cell-specific parameters.

TABLE 2

| srs-SubframeConfig | Binary | Configuration Period $T_{SFC}$ (subframes) | Transmission offset $\Delta_{SFC}$ (subframes) |
| --- | --- | --- | --- |
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | Reserved |

The $T_{SFC}$ indicates a cell-specific subframe configuration and the $\Delta_{SFC}$ indicates a cell-specific subframe offset. The srs-SubframeConfig is provided by an upper layer (e.g., RRC layer). The SRS is transmitted in a subframe that meets $\lfloor n_s/2 \rfloor \mod T_{SFC} \in \Delta_{SFC}$. The $n_S$ indicates a slot index. The $\lfloor \ \rfloor$ indicates a flooring function and the mod indicates a modulo operation.

The UE-specific SRS parameter includes srs-Bandwidth, srs-HoppingBandwidth, freqDomainPosition, srs-ConfigIndex, transmissionComb, and cyclicShift. The srs-Bandwidth indicates a value used for a corresponding user equipment to configure a frequency band for transmitting SRS. The srs-HoppingBandwidth indicates a value used to configure frequency hopping of SRS. The FreqDomainPosition indicates a value used for determine a frequency location for transmitting SRS. The srs-ConfigIndex indicates a value used for a corresponding user equipment to configure a subframe for transmitting SRS. The transmissionComb indicates a value used to configure an SRS transmission comb. And, the cyclicShift indicates a value used to configure a cyclic shift value applied to an SRS sequence.

Table 3 and Table 4 indicate SRS transmission periodicity and subframe offset in accordance with srs-ConfigIndex. The SRS transmission periodicity indicates a time interval (unit: subframe or ms) for a user equipment to periodically transmit SRS. Table 3 shows a case of FDD, while Table 4 shows a case of TDD. An SRS configuration ($I_{SRS}$) is signaled per user equipment and each user equipment then checks SRS transmission periodicity ($T_{SRS}$) and SRS subframe ($T_{offset}$) using the SRS configuration index ($I_{SRS}$).

TABLE 3

| SRS Configuration Index $I_{SRS}$ | SRS Periodicity $T_{SRS}$ (ms) | SRS Subframe Offset $T_{offset}$ |
| --- | --- | --- |
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 4

| Configuration Index $I_{SRS}$ | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

In summary, in the legacy LTE, the cell-specific SRS parameter informs a user equipment of a subframe occupied for SRS transmission in a cell. And, the UE-specific SRS parameter informs the user equipment of a subframe, which is to be actually used by the corresponding user equipment, among the subframes occupied for the SRS. The user equipment periodically transmits SRS via a specific symbol (e.g., a last symbol) of the subframe indicated by the UE-specific SRS parameter.

Meanwhile, in order to protect the SRS transmission in the subframe occupied via the cell-specific SRS parameter, it may be necessary for the user equipment not to transmit a UL signal via the last symbol of the subframe irrespective of whether the SRS is actually transmitted in the corresponding subframe.

Figure 6:
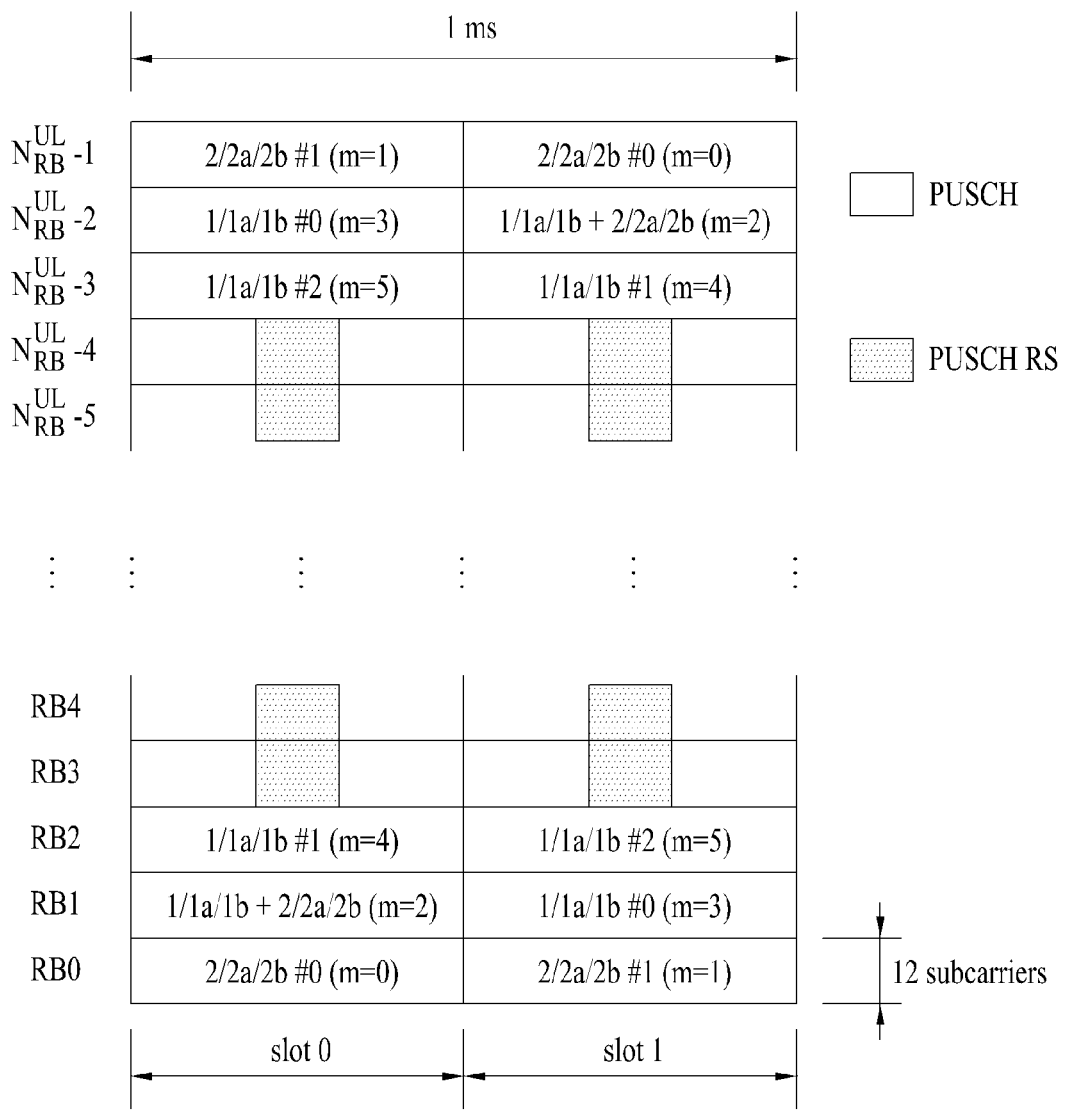
FIG. 6 shows one example of mapping PUCCH format to PUCCH region physically.

FIG. 6 shows one example of mapping PUCCH format to PUCCH region physically.

Referring to FIG. 6, PUCCH format is transmitted by starting from a band-edge in a manner of being inward mapped to RBs in order of PUCCH 2/2a/2b (CQI) (e.g., PUCCH region m=0, 1), PUCCH format 2/2a/2b (CQI) or PUCCH format 1/1a/1b (SR/HARQ ACK/NACK) (e.g., in case of presence, PUCCH region m=2), and PUCCH format 1/1a/1b (SR/HARQ ACK/NACK) (e.g., PUCCH region m=3, 4, 5). The number $N_{RB}^{(2)}$ of PUCCH RBs available for PUCCH format 2/2a/2b (CQI) is transmitted to a user equipment by broadcast signaling within a cell.

Figure 7:
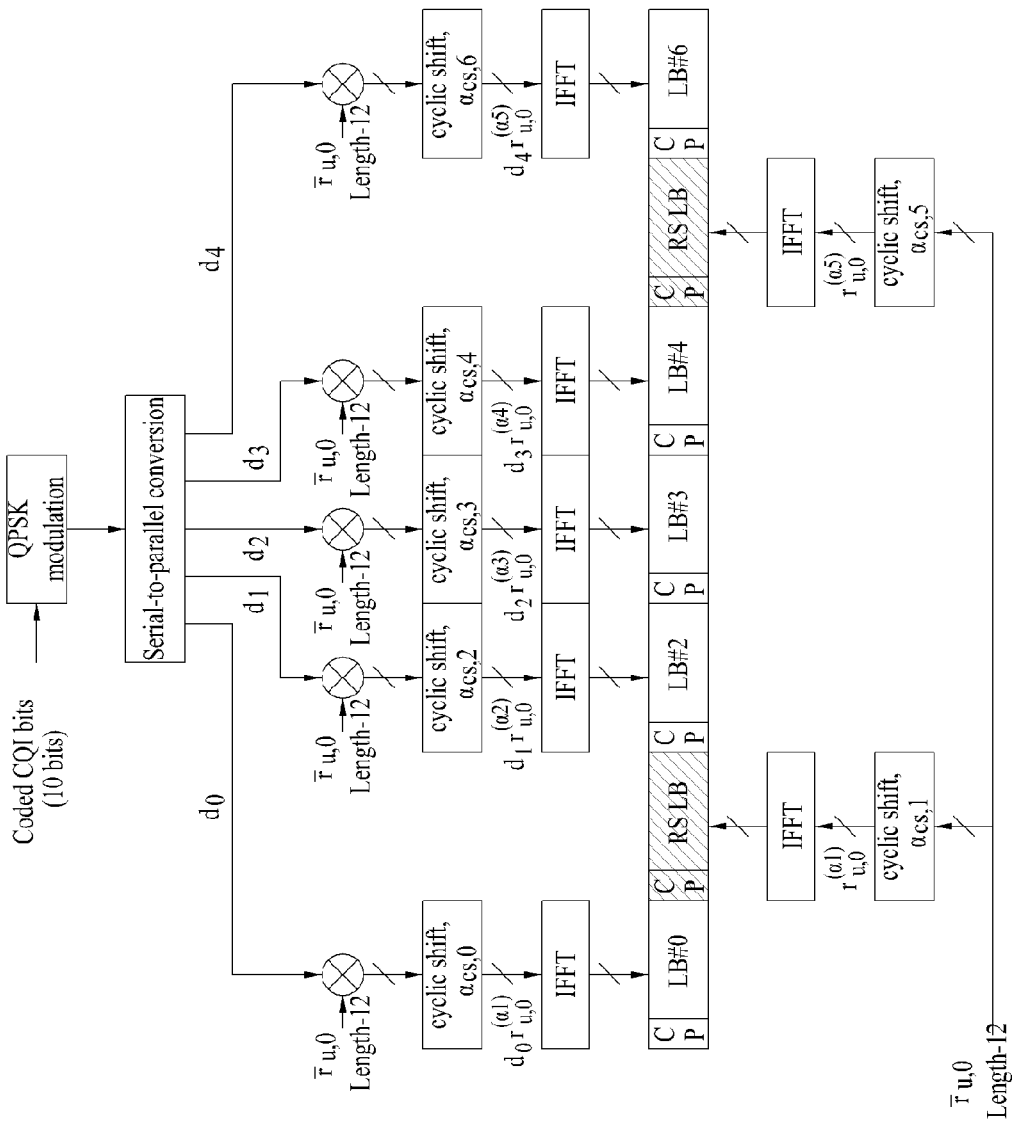
FIG. 7 shows a slot level structure of PUCCH format 2/2a/2b.

FIG. 7 shows a slot level structure of PUCCH format 2/2a/2b. PUCCH format 2/2a/2b is used for a CSI transmission. And, the CSI includes CQI, PMI, RI and the like. In case of a normal CP (Cyclic Prefix), SC-FDMA #1/#5 (LB #1/#5) within a slot is used for a DM RS (Demodulation Reference Signal) transmission. In case of an extended CP, only SC-FDMA #3 (LB #3) within a cell is used for a DM RS transmission.

Referring to FIG. 7, on a subframe level, 10-bit CSI information is channel coded into 20 coded bits using (20, k) Reed-Muller code punctured at ½ rate [not shown in the drawing]. Subsequently, the coded bits are scrambled [not shown in the drawing] and then mapped to QPSK (quadrature phase shift keying) constellation [QPSK modulation]. This scrambling can be performed using length-31 gold sequence similar to the case of PUSCH data. 10 QPSK modulated symbols are generated and 5 QPSK modulated symbols $d_0$~$d_4$ are transmitted via corresponding SC-FDMA symbols LB #0, LB #2, LB #3, LB #4 and LB #6 in each slot. Each of the QPSK modulated symbols is used to modulate a length-12 sequence $(r_{u,o})$ before IFFT (Inverse Fast Fourier Transform). Thereafter, each sequence is cyclically shifted [Cyclic Shift (CS)] $(d_x * r_{u,o}^{(\alpha x)}, x=0$~$4)$. Similarly, the DM RS sequence is cyclically shifted as well $(\alpha_{cs,x}, x=1, 5)$. If the number of the cyclic shifts is N, N user equipments can be multiplexed on the same CSI PUCCH RB. The DM RS sequence is similar to a CSI sequence in frequency domain but is not modulated by the CSI modulated symbol.

A parameter/resource for periodic reporting of CSI is configured semi-static by upper layer signaling (e.g., RRC (radio resource control) signaling). For instance, if a PUCCH resource index $n_{PUCCH}^{(2)}$ is configured for CSI transmission, CSI is periodically transmitted on CSI PUCCH linked to the PUCCH resource index $n_{PUCCH}^{(2)}$. And, the PUCCH resource index $n_{PUCCH}^{(2)}$ indicates PUCCH RB and cyclic shift $(\alpha_{cs})$.

Figure 8:
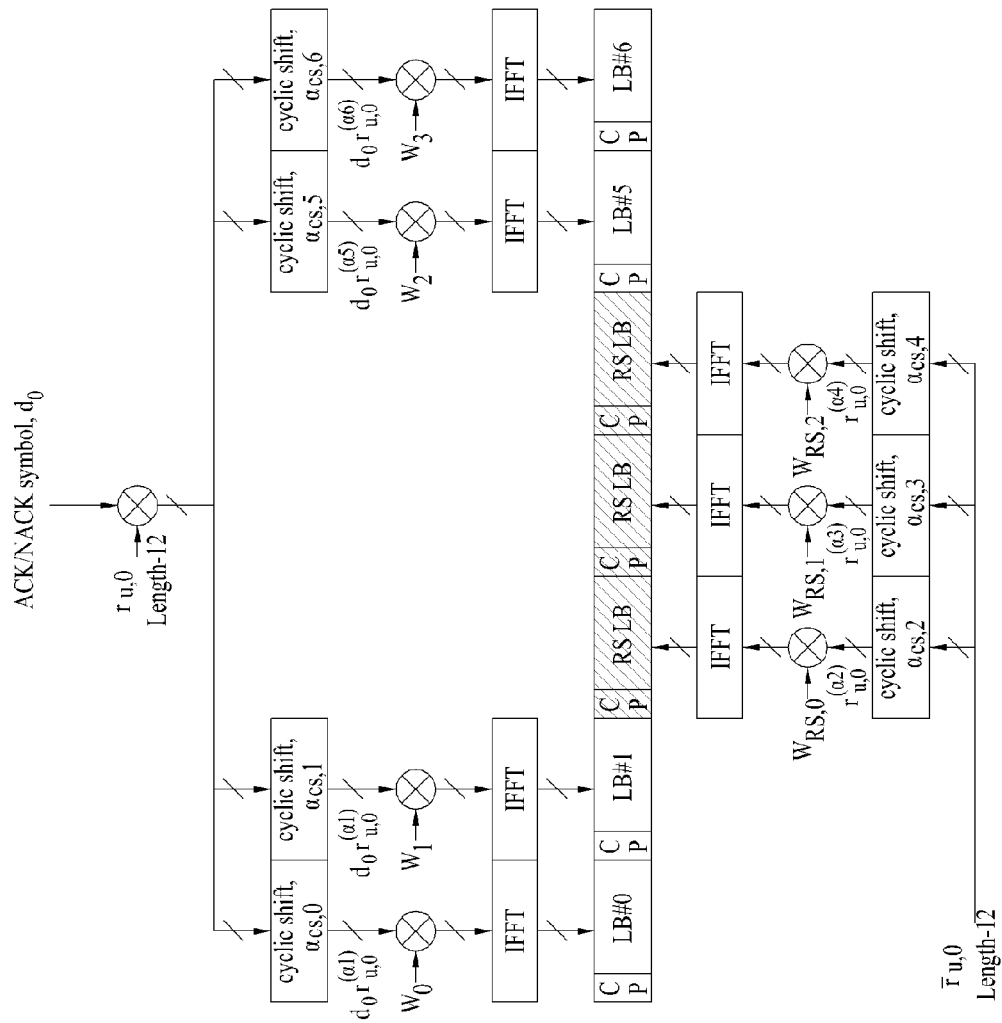
FIG. 8 shows a slot level structure of PUCCH format 1a/1b.

FIG. 8 shows a slot level structure of PUCCH format 1a/1b. PUCCH format 1a/1b is used for ACK/NACK transmission. In case of a normal CP, SC-FDMA #2/#3/#4 (LB #2/#3/#4) is used for DM RS (Demodulation Reference Signal) transmission. In case of an extended CP, SC-FDMA #2/#3 (LB #2/#3) is used for DM RS transmission. Hence, 4 SC-FDMA symbols in a slot are used for ACK/NACK transmission.

Referring to FIG. 8, 1-bit ACK/NACK information and 2-bit ACK/NACK information are modulated by BPSK modulation scheme and QPSK modulation scheme, respectively. And, one ACK/NACK modulated symbol $d_0$ is generated. PUCCH format 1a/1b performs cyclic shift $(\alpha_{cs,x})$ in frequency domain like the aforementioned CSI and also performs time domain spreading using orthogonal spreading codes $w_0$, $w_1$, $w_2$ and $w_3$ (e.g., Walsh-Hadamard or DFT code). In case of PUCCH format 1a/1b, since code multiplexing is used in both frequency and time domains, more user equipments can be multiplexed on the same PUCCH RB.

RSs transmitted from different user equipments are multiplexed by the same method of UCI. The number of cyclic shifts supported by the SC-FDMA symbol for PUCCH ACK/NACK RB may be configured by cell-specific upper layer signaling parameter $\Delta_{shift}^{PUCCH}$. And, $\Delta_{shift}^{PUCCH} \in \{1, 2, 3\}$ indicates that shift values are 12, 6 and 4, respectively. The number of spreading codes actually available for ACK/NACK in time-domain CDM may be limited by the number of RS symbols. This is because multiplexing capacity of RS symbols is smaller than that of UCI symbols due to the small number of RS symbols.

Figure 9:
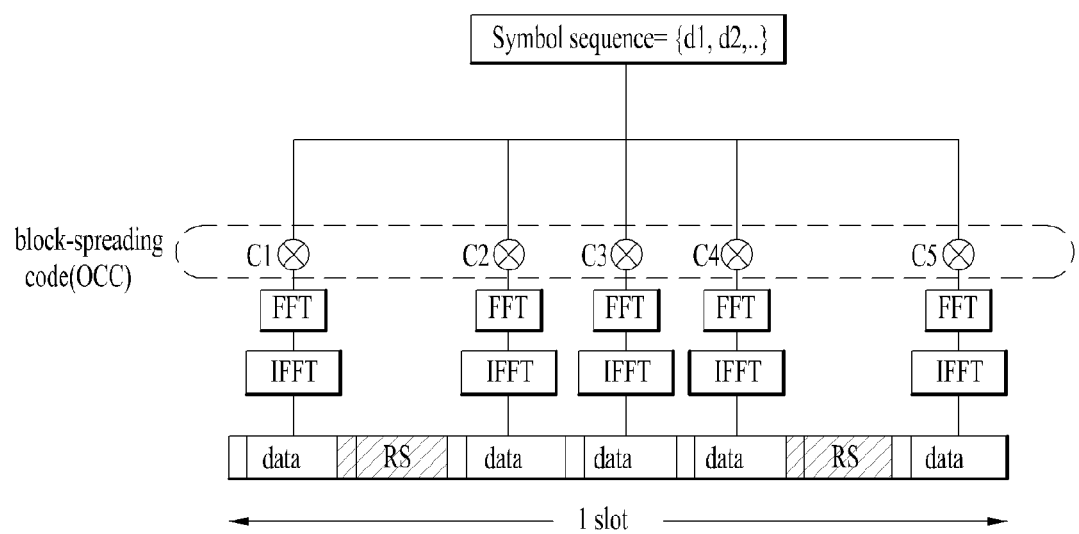
FIG. 9 and FIG. 10 show one example of PUCCH format 3.

FIG. 9 shows one example of PUCCH format 3 at a slot level. In PUCCH format 3, a single symbol sequence is transmitted across a frequency domain and user equipment multiplexing is performed using OCC (orthogonal cover code) based time-domain spreading. In particular, a symbol sequence is transmitted in a manner of being time-domain spread by OCC. Using OCC, it is able to multiplex control signals of several user equipments on the same RB.

Referring to FIG. 9, using OCCs (C1 to C5) of length-5 (i.e., spreading factor (SF)=5), 5 SC-FDMA symbols (i.e., UCI data part) are generated from a single symbol sequence {d1, d2, . . . }. In this case, the symbol sequence {d1, d2, . . . } may mean a modulated symbol sequence or a codeword bit sequence. If the symbol sequence {d1, d2, . . . } means the codeword bit sequence, the block diagram shown in FIG. 9 may further include a modulated block Although total 2 RS symbols (i.e., RS part) are used in 1 slot in the drawing, it may be able to consider various applications such as an application of using RS part configured with 3 RS symbols and UCI data part configured using OCC of 'SF=4' and the like. In this case, the RS symbol may be generated from CAZAC sequence having a specific cyclic shift. Moreover, the RS may be transmitted in a manner that a specific OCC is applied to a plurality of RS symbols in time domain or a plurality of RS symbols in time domain are multiplied by a specific OCC. Block-spread UCI is transmitted to a network through FFT (fast Fourier transform), IFFT (inverse fast Fourier transform) by SC-FDMA symbol unit. In particular, the block-spreading scheme modulates the control information (e.g., ACK/NACK, etc.) using SC-FDMA unlike PUCCH format 1 or 2 series of the legacy LTE.

Figure 10:
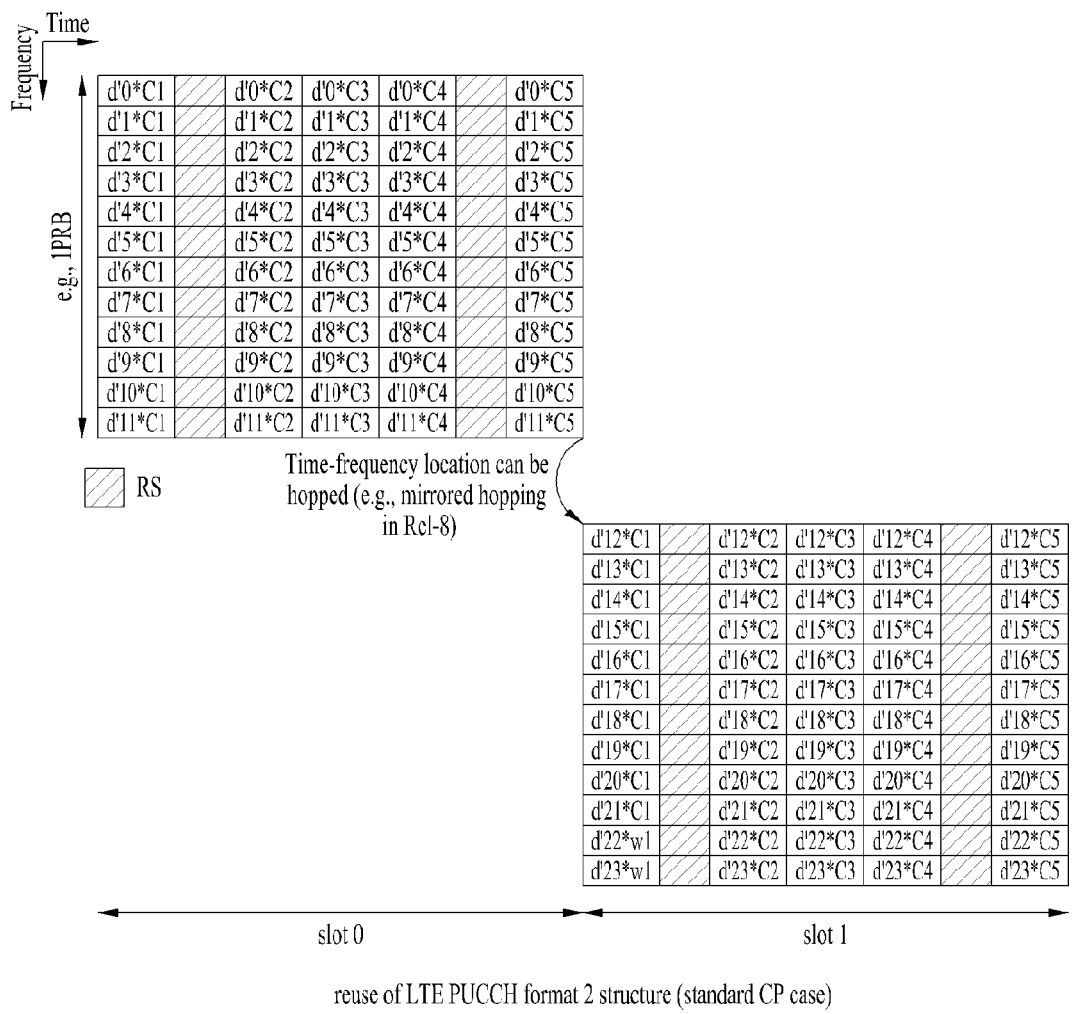

FIG. 10 shows one example of PUCCH format 3 at a subframe level.

Referring to FIG. 10, a symbol sequence {d'0~d'11} in a slot 0 is mapped to a subcarrier of an SC-FDMA symbol and is mapped to 5 SC-FDMA symbols by block-spreading using OCC (C1 to C5). Similarly, a symbol sequence {d'12~d'23} in a slot 1 is mapped to a subcarrier of an SC-FDMA symbol and is mapped to 5 SC-FDMA symbols by block-spreading using OCC (C1 to C5). In this case, the symbol sequence {d'0~d'11} or {d'12~d'23} shown in each slot indicates the form of applying FFT or FFT/IFFT to the symbol sequence {d1, d2, . . . } shown in FIG. 10. In case that the symbol sequence {d'0~d'11} or {d'12~d'23} has the form of applying FFT to the symbol sequence {d1, d2, . . . } shown in FIG. 10, the IFFT is additionally applied to the {d'0~d'11} or {d'12~d'23} for SC-FDMA generation. The whole symbol sequence {d'0~d'23} is generated by joint coding at least one UCI. The front half {d'0~d'11} is transmitted in the slot 0 and the rear half {d'12~d'23} is transmitted in the slot 1. Besides, the OCC is changeable by slot unit and UCI data can be scrambled by SC-FDMA symbol unit [not shown in the drawing].

Figure 11:
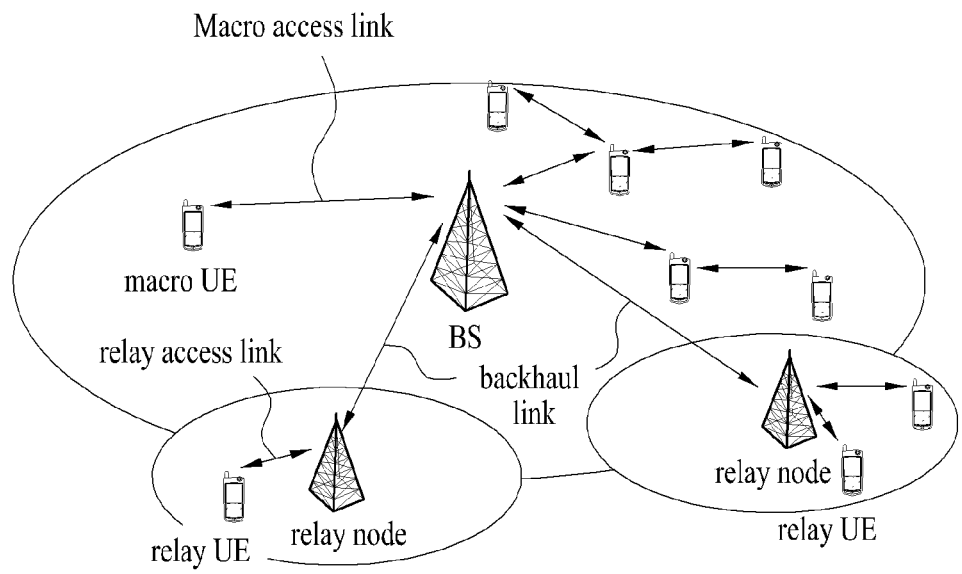
FIG. 11 shows one example of a wireless communication system including a relay node.

FIG. 11 shows one example of a wireless communication system including a relay (or a relay node (RN)). A relay node extends a service area of a base station or is installed in a radio shadow area to smooth a service operation. Referring to FIG. 11, a wireless communication system includes a base station, a relay node and a user equipment. The user equipment performs a communication with the base station or the relay node. For clarity, a user equipment configured to communicate with a base station shall be named a macro user equipment (i.e., a macro UE) and a user equipment configured to communicate with a relay node shall be named a relay user equipment (i.e., a relay UE). A communication link between a base station and a macro user equipment shall be named a macro access link and a communication link between a relay node and a relay user equipment shall be named a relay access link (simply, a Uu link). A communication link between a base station and a relay node shall be named a backhaul link (simply, a Un link).

Relay nodes can be categorized into L1 (layer 1) relay node, L2 (layer 2) relay node and L3 (layer 3) relay node depending on how many functions the corresponding relay node can perform in multi-hop transmission. Features of the relay nodes are described in brief as follows. First of all, the L1 relay node performs a function of a repeater. The L1 relay node simply amplifies a signal from a base station or a user equipment and then transmits the amplified signal to the user equipment or the base station. Since the relay does not perform decoding, it is advantageous in that a transmission delay is short. Yet, since the relay node is unable to discriminate a signal and a noise from each other, it is disadvantageous in that the noise is amplified as well. In order to complement such disadvantage, it may be able to use an advanced repeater (or a smart repeater) provided with such a function as a UL power control and a self-interference cancellation. An operation of the L2 relay node may be represented as 'decode-and-forward' and is capable of transmitting a user plane traffic to L2 . In the L2 relay node, it is advantageous in that a noise is not amplified. Yet, it is disadvantageous in that a delay increases due to decoding. The L3 relay node may be called self-backhauling and is able to transmit IP packets to L3. Since the L3 relay node includes an RRC (radio resource control) function, it plays a role as a small-scale base station.

The L1/L2 relay node may be described as a case that a relay node is a part of a donor cell covered by a corresponding base station. In case that a relay node is a part of a donor cell, since the relay node is unable to control a cell of its own and user equipments of the corresponding cell, the relay node is unable to have a cell ID of its own. Yet, the relay node may have a relay ID that is an ID (identity) of the corresponding relay node. Moreover, in this case, some functions of RRM (radio resource management) are controlled by a base station of the corresponding donor cell and some portions of the RRM may be situated at the corresponding relay node. The L3 relay node corresponds to a case that a relay node is able to control its cells. In this case, the relay node is able to manage at least one cell and each of the cells managed by the relay node may be able to have a unique physical-layer cell ID. The relay node may have the same RRM mechanism. And, in viewpoint of a user equipment, there is no difference between accessing a cell managed by a relay node and accessing a cell managed by a normal base station.

Relay nodes can be classified in accordance with mobility as follows.

Fixed relay node (fixed RN): This is permanently fixed and used for shadow area or cell coverage enhancement. This is able to play a role as a simple repeater.

Nomadic relay node (nomadic RN): This is temporarily installed in case of a sudden increase of users. This is randomly movable within a building.

Mobile relay node (mobile RN): This is installable on such a public transportation as a bus, a subway and the like. This needs to be supported with relay mobility.

Relays can be classified into in accordance with a link of a network as follows.

In-band connection: A network-to-relay link and a network-to-user equipment link share the same frequency band with each other in a donor cell.

Out-band connection: A network-to-relay link and a network-to-user equipment link use different frequency bands in a donor cell, respectively.

Relays can be classified as follows, depending on whether a user equipment recognizes a presence of a relay node.

Transparent relay node: A user equipment is unaware whether a communication with a network is performed via a relay node.

Non-transparent relay node: A user equipment is aware that a communication with a network is performed via a relay node.

Figure 12:
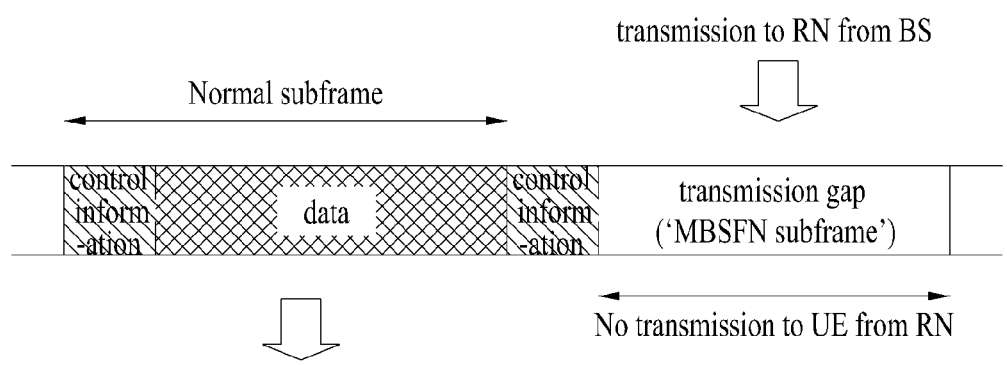
FIG. 12 shows one example of backhaul communication using MBSFN (multimedia broadcast over a single frequency network) subframe.

FIG. 12 shows one example of backhaul transmission using MBSFN (multimedia broadcast over a single frequency network) subframe. In an in-band relay mode, a BS-RN link (i.e., a backhaul link) operates on the same frequency band of an RN-UE link (i.e., a relay access link). When a relay node transmits a signal to a user equipment while receiving a signal from a base station, and vice versa, since a transmitter and a receiver of the relay node trigger mutual interference, the relay node may be restricted from performing the transmission and the reception at the same time. To this end, the backhaul link and the relay access link are partitioned by TDM scheme. In order to support a measurement operation of a legacy LTE user equipment existing in a relay zone, LTE-A configures a backhaul link in MBSFN subframe [Fake MBSFN Method]. If a random subframe is signaled to an MBSFN subframe, since a user equipment receives a control region (ctrl) of the corresponding subframe, a relay node is able to configure a backhaul link using a data region of the corresponding subframe. For instance, a relay PDCCH (R-PDCCH) is transmitted using a specific resource region within a $3^{rd}$ OFDM symbol to a last OFDM symbol of the MBSFN subframe.

In order to raise BS-RN/RN-UE radio link efficiency, a network including a relay node uses various kinds of synchronization schemes. According to one of the synchronization schemes, a boundary of a UL subframe received by a base station from a relay node is made to coincide with a base station UL subframe boundary. If the subframe boundaries coincide with each other, it can be represented as aligned. Meanwhile, a relay node is unable to simultaneously perform both a DL reception and a DL transmission using the same carrier. Hence, the relay node needs to operate by switching two kinds of transmission modes to each other. In order to switch the transmission mode, a time, i.e., a TX-to-RX switching time or an RX-to-TX switching time, is necessary. A time loss portion due to the transmission mode switching may be obtained from a backhaul link or a relay access link. In case that the time loss portion is obtained from the backhaul link, some of backhaul symbols may be usable for a switching time by being configured in a guard time form. Since the guard time configured symbol is not usable for the data transmission, it is wasted.

Figure 13:
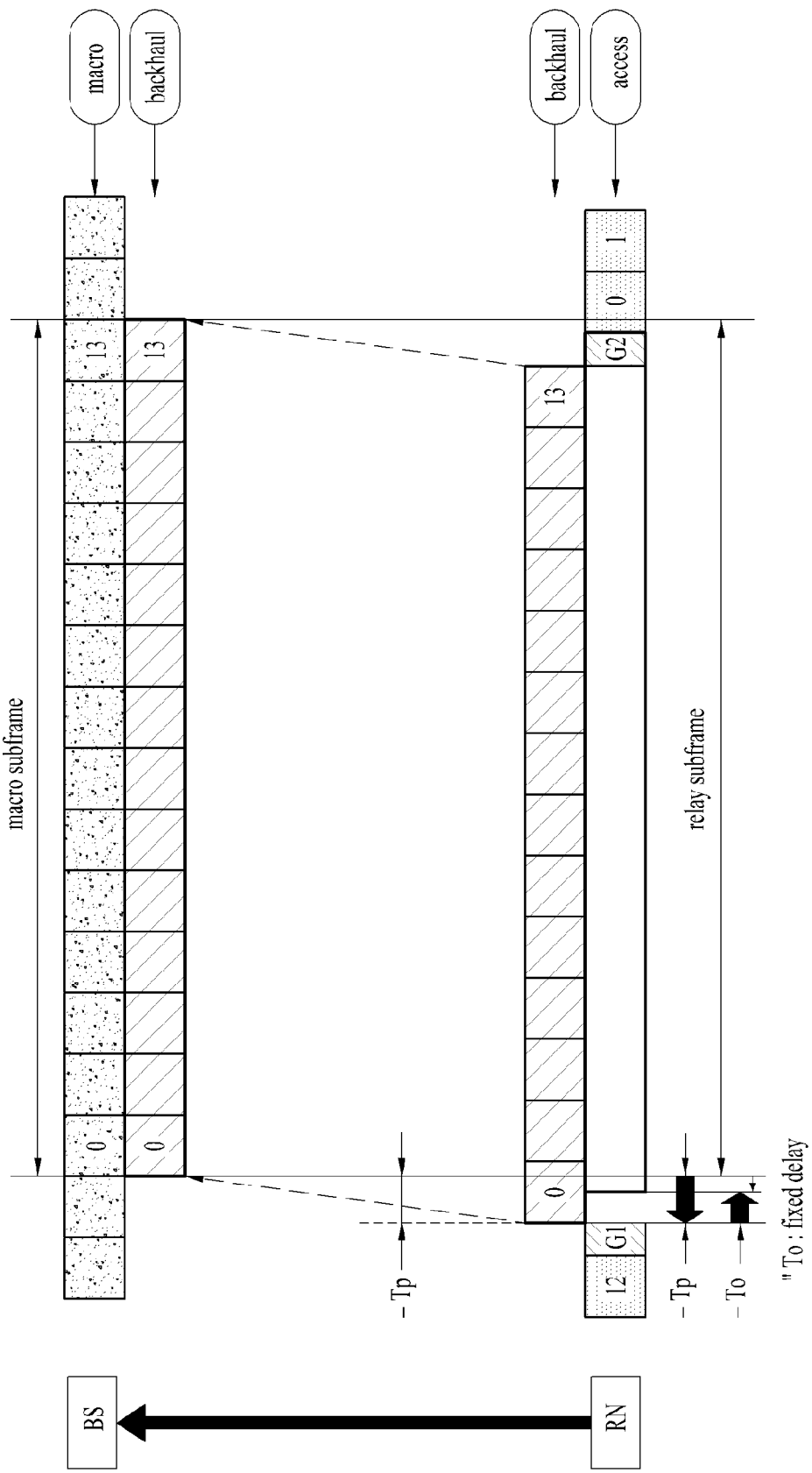
FIG. 13 and FIG. 14 show examples of a timing configuration between a base station and a relay node applicable to Un uplink.
Figure 14:
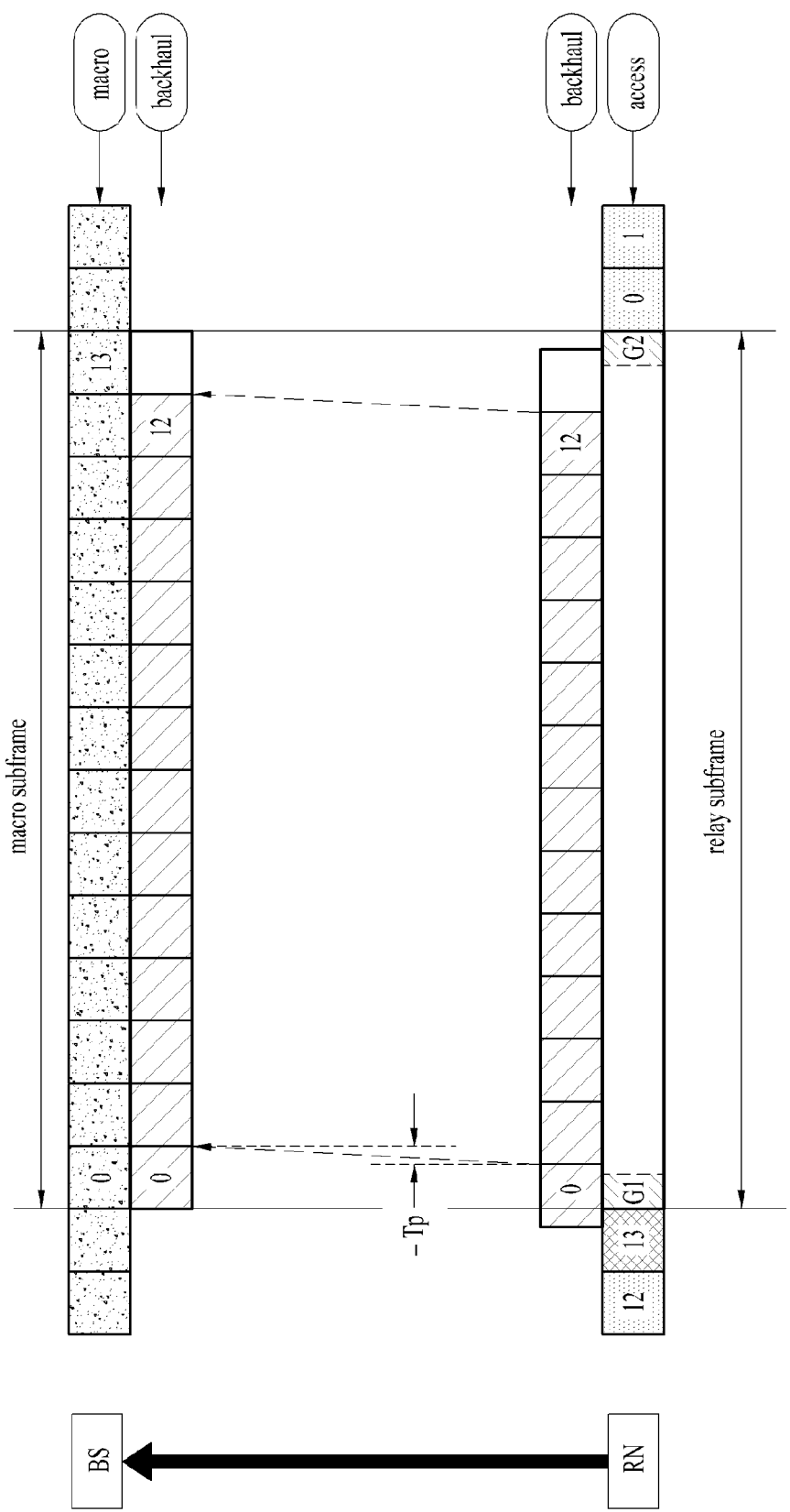

FIG. 13 and FIG. 14 show examples of a timing configuration between a base station and a relay node applicable to Un uplink. In the drawings, if a boundary of a relay backhaul UL subframe and a boundary of a relay access link UL subframe are misaligned, it is able to increase efficiency in using resources of a backhaul link. It may be able to adjust a boundary of a subframe using a propagation delay Tp and a time offset To. The time offset To may indicate a delay or an advance. The time offset To may have a fixed value. In the drawings, 'macro' indicates a macro UL subframe, 'backhaul' indicates a backhaul UL subframe, and 'access' indicates a relay access UL subframe. Moreover, a TX-to-RX switching time and an RX-to-TX switching time are denoted by G1 and G2, respectively.

According to the timing configurations shown in FIG. 13 and FIG. 14, an index of a last symbol available for a UL transmission in a $2^{nd}$ slot is 5 or 6 (in case of a normal CP). In case of an extended CP, the index of the last symbol is 4 or 5. In particular, the index of the last symbol available for the UL transmission in the $2^{nd}$ slot becomes 6 according to the timing configuration shown in FIG. 13 but becomes 5 according to the timing configuration shown in FIG. 14. And, the timing configuration shown in FIG. 13 or FIG. 14 may be configured by upper layer signaling (e.g., RRC signaling).

FIG. 15 shows one example of an operation in case of the setting of the timing configuration shown in FIG. 14.

Referring to FIG. 15, in case of the setting of the timing configuration shown in FIG. 14, a relay node is unable to use the last symbol (i.e., symbol #6) of the $2^{nd}$ slot for the transmission of PUSCH/PUCCH signal. Meanwhile, if it is unable to use the last symbol of the $2^{nd}$ slot, it may be able to use a rate matching not to use the last symbol in the $2^{nd}$ slot in case of PUSCH. Moreover, in case of PUCCH format 1/1a/1b, a shortened format of not using the last symbol in the $2^{nd}$ slot is defined in the legacy LTE. Hence, in case that the timing configuration shown in FIG. 14 is signaled, the PUSCH signal is rate matched and a PUCCH format 1/1a/1b signal can be transmitted using the shortened PUCCH format.

Yet, in case of PUCCH format 2/2a/2b, the shortened format is not defined in the legacy LTE unlike the PUCCH format 1/1a/1b. Moreover, PUCCH format 3 is the PUCCH format newly introduced into LTE-A. Like the PUCCH format 2/2a/2b, the shortened format is not defined in the PUCCH format 3. Hence, in case of the setting of the timing configuration shown in FIG. 14, a separate transmitting method is necessary to transmit a PUCCH format 2/2a/2b/3 signal in backhaul/uplink. Simply, in a situation that the last symbol of the $2^{nd}$ slot is not usable, it is able to puncture a last symbol of the PUCCH format 2/2a/2b/3 signal. Since a base station and a relay node is able to know the situation in which the last symbol of the Un link (i.e., BS-RN link) is not transmittable due to the TX/RX switching, the base station is able to decode the PUCCH format 2/2a/2b/3 signal in consideration of puncturing. If the shortened format is defined in the PUCCH format 2/2a/2b/3, it may be able to use the defined shorted format.

Yet, in case that the timing configuration shown in FIG. 14 is set, it is possible to transmit PUSCH/PUCCH signal in backhaul/UL without using the rate matching or the shortened format.

FIG. 16 shows one example of backhaul/uplink transmission according to one embodiment of the present invention.

Referring to FIG. 16, if a least two backhaul subframes (e.g., subframe #n and subframe #(n+1)) are contiguously configured, since the TX/RX switching is not performed between the backhaul subframes (i.e., subframe #n and subframe #(n+1)), it may be able to use a last symbol of the former backhaul subframe (i.e., subframe #n) for a backhaul transmission. Therefore, it is able to perform a transmission of SRS, a normal-length PUCCH or a normal-length PUSCH in the last symbol of the former backhaul subframe (subframe #n). In order to enable such an operation, an agreement between a base station and a relay node is necessary. In particular, information indicating whether the last symbol in the $2^{nd}$ slot (or subframe) is used and/or information on the corresponding operation needs to be exchanged or agreed in advance between the base station and the relay node. The information indicating whether the last symbol in the $2^{nd}$ slot (or subframe) is used and/or the information on the corresponding operation is configured by an upper layer signaling (e.g., an RRC signaling) or may be implicitly designated depending on transmission mode/configuration mode/timing configuration/backhaul subframe configuration.

As mentioned in the foregoing description, in case that contiguous backhaul subframes exist in the timing configuration shown in FIG. 14, the relay node may be able to always transmit SRS, last symbol of PUCCH or last symbol of PUSCH in the former backhaul subframe (subframe #n). The relay node is able to transmit the SRS only if the SRS configured to be transmitted in the corresponding subframe. In particular, in case that the RN-specific SRS configured subframe and the contiguous backhaul subframe do not coincide with each other, the SRS is not transmitted. Meanwhile, if the contiguous backhaul subframes are configured irrespective of the previous SRS configuration signaling, the relay node is able to always transmit the SRS in the former subframe (subframe #n). In this case, the base station may be able to intentionally configure contiguous backhaul subframes for the backhaul SRS transmission.

It is possible for the transmission of PUCCH/PUSCH to perform the operation similar to that of the SRS. In particular, if contiguous backhaul subframes (subframe #n and subframe #(n+1)) are assigned for the backhaul transmission, the former backhaul subframe (subframe #n) autonomously uses PUCCH/PUSCH of a normal length. If a single subframe is assigned for the backhaul transmission, it may be able to use the shortened subframe structure. In case that a plurality of contiguous subframes are assigned for the backhaul transmission, operations of a relay node and a base station should be designated in advance. In other words, in case that a plurality of contiguous subframes are assigned for the backhaul transmission, it may be able to designate the normal PUCCH, PUSCH and SRS transmissions, which are to be unconditionally performed in the former backhaul subframe, in advance by signaling or implicitly. Moreover, it may be able to set such an operation to be enabled or disabled by a separate upper layer signaling (e.g., RRC signaling).

For instance, if backhaul subframes are contiguously generated, it may be able to set the SRS to be always transmitted in the former backhaul subframe (subframe #n) irrespective of SRS configuration [autonomous transmission=ON]. Alternatively, although backhaul subframes are contiguously configured, it may be able to set the SRS not to be transmitted in the former backhaul subframe [autonomous transmission=OFF]. Likewise, if backhaul subframes are contiguously configured, it may be able to set a normal PUCCH format to be used in the former backhaul subframe [shortened format=OFF]. Alternatively, although backhaul subframes are contiguously configured, it may be able to set the shortened format to be used [shortened format=ON]. In case of the PUSCH transmission, if backhaul subframes are contiguously configured, it may be able to set a last symbol of a subframe to be used for a PUSCH signal transmission in the former backhaul subframe [rate matching=OFF]. Alternatively, although backhaul subframes are contiguously configured, it may be able to set the last symbol of the subframe not to be used for the PUSCH signal transmission [rate matching=ON].

It may be able to deliver the above-mentioned information (e.g., 'autonomous transmission', 'shortened format', 'rate matching', etc.) using RRC signaling. In this case, although the aforementioned information is not frequently changeable, since Un subframe configuration does not change frequently, it can be implemented with the RRC signaling. If the aforementioned information is set to a specific value and backhaul subframes are contiguously configured, a relay node determines a transmission form of a UL signal in accordance with the setup value and then performs a corresponding operation.

Figure 17:
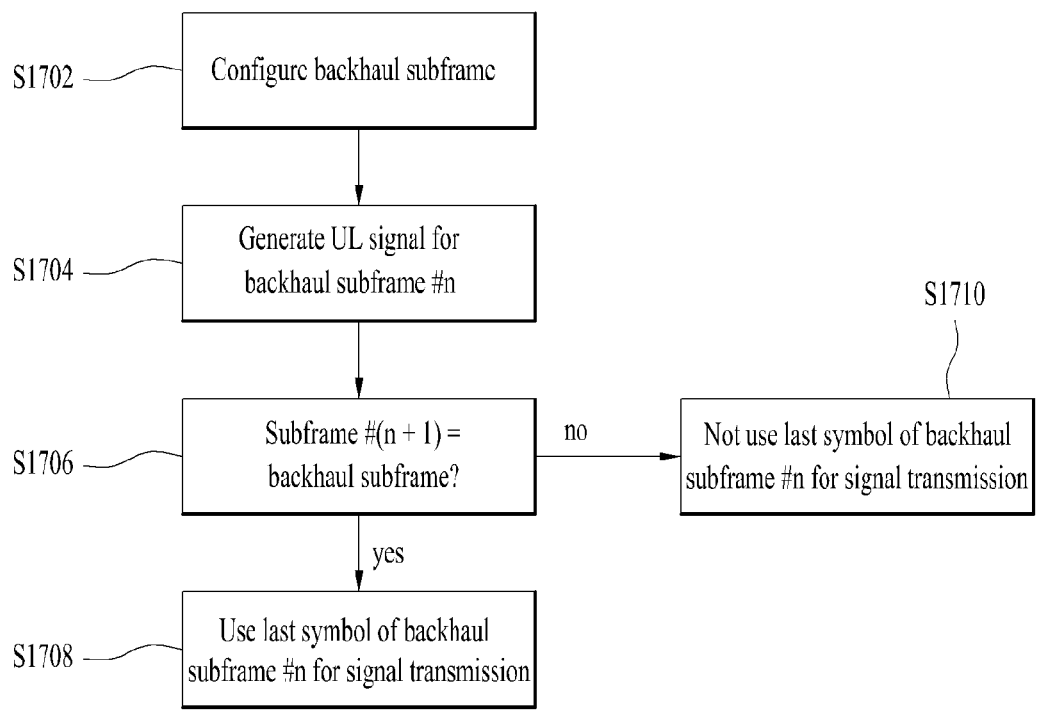
FIG. 17 shows one example of a backhaul/uplink transmitting process according to one embodiment of the present invention.

FIG. 17 shows one example of a backhaul/uplink transmitting process according to one embodiment of the present invention.

Referring to FIG. 17, a relay node configures a backhaul subframe [S1702]. The backhaul subframe may be indicated as a bitmap form by an upper layer signaling (e.g., RRC signaling). Each bit of a bitmap corresponds to a subframe. In particular, if a corresponding bit is set to 1, a backhaul subframe is configured. If a corresponding bit is set to 0, an aces subframe may be configured. A separate bitmap may be defined for UL and DL backhaul subframes. Moreover, a bitmap for a DL backhaul subframe is signaled only and a UL backhaul subframe may be analogized from a DL backhaul subframe configuration. For instance, if a DL subframe #m is configured as a DL backhaul subframe, a UL subframe #(m+4) may be configured as a UL backhaul subframe. Subsequently, the relay node generates a UL signal for a UL backhaul subframe #n [S1704]. UL signal may include SRS signal, PUCCH signal and PUSCH signal.

Thereafter, the relay node checks whether the UL subframe #(n+1) is a UL backhaul subframe [S1706]. If the UL subframe #(n+1) is the UL backhaul subframe, the relay node is able to use a last symbol of the UL backhaul subframe #n for a signal transmission [S1708]. Hence, an SRS signal transmission, a normal PUCCH signal transmission and a normal PUSCH signal transmission are possible. On the contrary, if the UL subframe #(n+1) is not the UL backhaul subframe, the relay node is unable to use the last symbol of the UL backhaul subframe #n for the signal transmission [S1710]. Therefore, the SRS signal transmission is dropped and a PUCCH signal is transmitted using a shortened PUCCH format or a rate-matched PUSCH signal transmission is possible.

Meanwhile, if the UL subframe #n is a subframe configured as an RN-specific SRS subframe despite being configured as a cell-specific SRS subframe, although the UL subframe #(n+1) is a UL backhaul subframe, a last symbol of the subframe may not be usable. This is because, in case of the subframe configured as the RN-specific SRS subframe despite being configured as the cell-specific SRS subframe, the relay node may not transmit the last symbol to protect an SRS transmission of another relay node/user equipment. In case that the last symbol of the UL subframe #n is not usable in accordance with the SRS configuration, the relay node should puncture a last symbol of the PUCCH/PUSCH signal (e.g., shortened format). The base station knows a fact that there is no signal transmission in the last symbol and should perform demodulation/decoding by reflecting the fact.

In the present example, the step S1706 and the step S1708 may be optionally or selectively applicable by an upper layer signaling (e.g., an RRC signaling) or in accordance with a specific condition. In particular, if the operations in the step S1706 and the step S1708 are set not to be performed, the step S1706 and the step S1708 may be excluded from the process shown in FIG. 17. The application of the step S1706 and the step S1708 may be independently set in accordance with a type of a UL Signal. For instance, it may be able to determine whether to apply the step S1706 and the step S1708 depending on "autonomous transmission=ON/OFF" (SRS), "shortened format=ON/OFF" (PUCCH), and "rate matching=ON/OFF" (PUSCH).

The above description a made centering on the Un link (i.e., BS-RN link). Yet, the above-described method is applicable to a case of transmitting SRS signal, PUCCH signal or PUSCH signal in the Uu link (i.e., RN-UE link). In particular, if a subframe #n is a Uu subframe (i.e., an access subframe) and a subframe #(n+1) is a Un subframe (i.e., a backhaul subframe), a user equipment is unable to transmit a last symbol of the Uu subframe. Due to such restriction, some restrictions are put on SRS signal transmission, PUCCH signal transmission and PUSCH signal transmission of the user equipment. In order for the user equipment to transmit the last symbol of the Uu subframe, the subframe #(n+1) is not set as the Un subframe or set as the Uu subframe. In particular, in case that Uu subframes are contiguously configured, the user equipment is able to transmit an SRS signal, a normal PUCCH signal and a normal PUSCH signal in the former Uu subframe. The detailed method is identical to the former description in association with the Un link. In particular, if a backhaul is replaced by an access in FIG. 17, the process shown in FIG. 17 is extended to a process for Un/UL transmission. And, the step S1706 shown in FIG. 17 can be generalized into a step of determining whether the subframe #n and the subframe #(n+1) are subframes for different links or for the same link. In case of the process for the relay node, the step S1706 shown in FIG. 17 determines whether the subframe #(n+1) is a backhaul subframe if the subframe #n is a backhaul subframe. On the contrary, in case of the process for the user equipment, the step S1706 shown in FIG. 17 determines whether the subframe #(n+1) is an access subframe if the subframe #n is an access subframe.

The above-mentioned description is not limited to the case that one last symbol of a subframe is not transmittable. The present invention can be extended to a case that it is unable to transmit m contiguous symbols at the end of the subframe. And, the present invention is applicable to a case that it is unable to transmit a front part of the subframe (e.g., a $1^{st}$ symbol of the subframe, a $2^{nd}$ symbol of the subframe, etc.).

In addition, in the mode of puncturing and transmitting the last symbol, i.e., in case of transmitting a CQI having a shortened length, the base station should know the fact that the CQI is not present at the last symbol and should perform demodulation by reflecting the fact.

In particular, in case that the RN-specific SRS configuration is not performed despite the cell-specific subframe, the relay node does not transmit SRS but is able to perform a CQI transmission. Yet, if the timing configuration is unable to use the last symbol, it causes a problem of CQI transmission and reception. If a CQI is transmitted in a full subframe, it may miss a switching timing point (e.g., a case that a next subframe is a Uu subframe). Hence, the relay node has to transmit the CQI except the last symbol. The base station is able to successfully perform the demodulation only if knowing such a situation. In case of PUCCH format 3, the similar problem is caused. If there exists a parameter for enabling a shortened format of the PUCCH format 3, a shortened PUCCH format 3 is used in the aforementioned problematic subframe using the existing parameter. If the cell-specific or RN-specific SRS configuration is used, the PUCCH format 3 should be transmitted by being punctured. And, the base station should be aware of this situation. This technology may be similarly applicable to the Uu situation.

Figure 18:
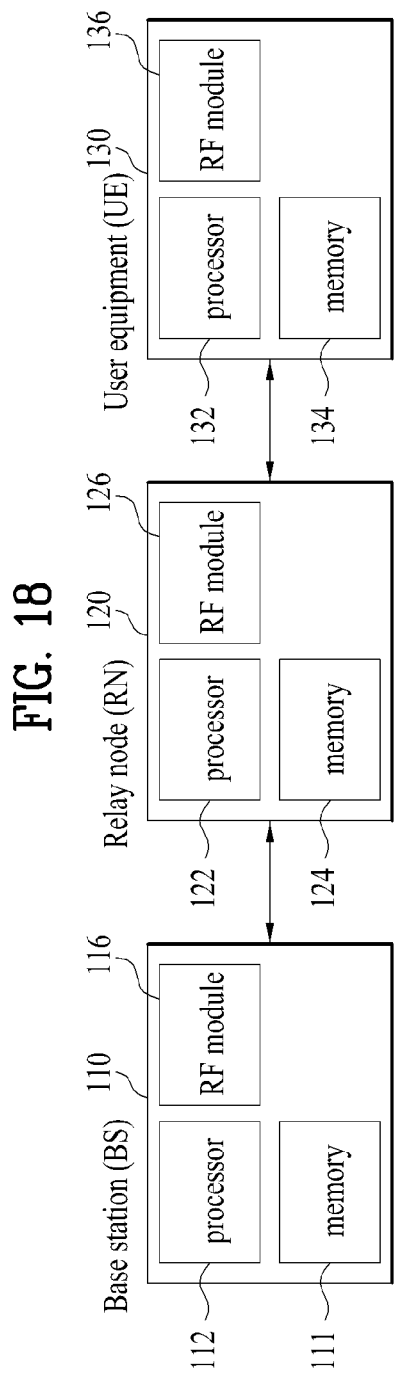
FIG. 18 shows one example of a base station, a relay node and a user equipment, applicable to embodiments of the present invention.

FIG. 18 shows one example of a base station, a relay node and a user equipment, applicable to embodiments of the present invention.

Referring to FIG. 18, a wireless communication system includes a base station (BS) 110, a relay node (RN) 120 and a user equipment (UE) 130. For clarity, the user equipment is connected to the relay node in the drawing. Instead, the user equipment may be connected to the base station.

The base station 110 includes a processor 112, a memory 114 and a radio frequency (RF) unit 116. The processor 112 may be configured to implement the procedures and/or methods proposed by the present invention. The memory 114 is connected to the processor 112 and stores various kinds of information related to operations of the processor 112. The RF unit 116 is connected to the processor 112 and receives and/or transmits wireless signals. The relay node 120 includes a processor 122, a memory 124 and an RF unit 126. The processor 122 may be configured to implement the procedures and/or methods proposed by the present invention. The memory 124 is connected to the processor 122 and stores various kinds of information related to operations of the processor 112. The RF unit 126 is connected to the processor 122 and receives and/or transmits wireless signals. The user equipment 130 includes a processor 132, a memory 134 and an RF unit 136. The processor 132 may be configured to implement the procedures and/or methods proposed by the present invention. The memory 134 is connected to the processor 132 and stores various kinds of information related to operations of the processor 132. The RF unit 136 is connected to the processor 132 and receives and/or transmits wireless signals. Each of the base station 110, the relay node 120 and the user equipment 130 may have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, embodiments of the present invention are described centering on the data transmission/reception relations between a base station and a user equipment. In this disclosure, a specific operation explained as performed by a base station may be performed by an upper node of the base station in some cases. In particular, in a network constructed with a plurality of network nodes including a base station, it is apparent that various operations performed for communication with a user equipment may be performed by a base station or other networks (e.g., relay, etc.) except the base station. In this case, 'base station' can be replaced by such a terminology as a fixed station, a Node B, an eNode B (eNB), an access point and the like. And, 'terminal' may be replaced by such a terminology as a user equipment (UE), a mobile station (MS), a mobile subscriber station (MSS)' and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

Industrial Applicability

Accordingly, the present invention is applicable to such a wireless communication device as a user equipment, a relay node, a base station and the like.

What is claimed is:

1. A method for performing an uplink transmission of a communication apparatus in a wireless communication system, the method comprising:
    receiving control information from a base station by high layer signaling;
    generating a sounding reference signal (SRS) for the uplink transmission; and
    transmitting the SRS using a subframe #n,
    wherein the SRS is transmitted on a symbol located last on a time axis in the subframe #n,
    wherein if the subframe #n and a subframe #(n+1) are subframes for different links, respectively, the SRS is not transmitted in a last symbol of the subframe #n,
    wherein if the subframe #n and the subframe #(n+1) are subframes for a same link, the SRS is transmitted using the last symbol of the subframe #n when the subframe #n is a subframe configured as a relay node (RN)-specific SRS subframe,
    wherein if the subframe #n and the subframe #(n+1) are subframes for the same link, the SRS is not transmitted in a last symbol of the subframe #n when the subframe #n is a subframe configured as a cell-specific SRS subframe, and
    wherein the control information includes information on whether the last symbol of the subframe #n is used for transmission of the signal.

2. The method of claim 1, wherein the communication apparatus is a relay node.

3. The method of claim 2, wherein if the subframe #n and the subframe #(n+1) are a backhaul subframe and an access subframe, respectively, the SRS is not transmitted in the last symbol of the subframe #n, and
    wherein if both of the subframe #n and the subframe #(n+1) are backhaul subframes, the SRS is transmitted using the last symbol of the subframe #n.

4. The method of claim 1, wherein the communication apparatus is a user equipment.

5. The method of claim 4, wherein if the subframe #n and the subframe #(n+1) are an access subframe and a backhaul subframe, respectively, the SRS is not transmitted in the last symbol of the subframe #n, and
    wherein if both of the subframe #n and the subframe #(n+1) are access subframes, the SRS is transmitted using the last symbol of the subframe #n.

6. A communication apparatus, which is used in a wireless communication system, the communication apparatus comprising:
    an RF (radio frequency) unit; and
    a processor configured to receive control information from a base station by high layer signaling,
    wherein the processor is further configured to:
        generate a sounding reference signal (SRS) for the uplink transmission, and transmit the SRS signal-using a subframe #n,
    wherein the SRS is transmitted on a symbol located last on a time axis in the subframe #n,
    wherein if the subframe #n and a subframe #(n+1) are subframes for different links, respectively, the SRS is not transmitted in a last symbol of the subframe #n when the subframe #n is a subframe configured as a relay node (RN)-specific SRS subframe,
    wherein if the subframe #n and the subframe #(n+1) are subframes for a same link, the SRS is not transmitted in a last symbol of the subframe #n when the subframe #n is a subframe configured as a cell-specific SRS subframe, and
    wherein the control information includes information on whether the last symbol of the subframe #n is used for transmission of the signal.

7. The communication apparatus of claim 6, wherein the communication apparatus is a relay node.

8. The communication apparatus of claim 7, wherein if the subframe #n and the subframe #(n+1) are a backhaul subframe and an access subframe, respectively, the SRS is not transmitted in the last symbol of the subframe #n, and
    wherein if both of the subframe #n and the subframe #(n+1) are backhaul subframes, the SRS is transmitted using the last symbol of the subframe #n.

9. The communication apparatus of claim 6, wherein the communication apparatus is a user equipment.

10. The communication apparatus of claim 9, wherein if the subframe #n and the subframe #(n+1) are an access subframe and a backhaul subframe, respectively, the SRS is not transmitted in the last symbol of the subframe #n, and
    wherein if both of the subframe #n and the subframe #(n+1) are access subframes, the SRS is transmitted using the last symbol of the subframe #n.

* * * * *